United States Patent

Kuroda et al.

[11] Patent Number: 5,832,983
[45] Date of Patent: Nov. 10, 1998

[54] CASTING MOLD FOR MOLDINGS

[75] Inventors: Motokazu Kuroda; Koji Nakatuma, both of Tokyo, Japan

[73] Assignee: Mitsubishi Denki Kabushiki Kaisha, Tokyo, Japan

[21] Appl. No.: 730,759

[22] Filed: Oct. 15, 1996

[30] Foreign Application Priority Data

Mar. 29, 1996 [JP] Japan .................................. 8-077349

[51] Int. Cl.⁶ .................................................. B22D 17/22
[52] U.S. Cl. ........................................ 164/342; 164/137
[58] Field of Search .................................. 164/137, 342, 164/312

[56] References Cited

U.S. PATENT DOCUMENTS 3,756,553  9/1973  Ranz ........................................ 164/137
4,835,428  5/1989  Komnurasaki et al. .

FOREIGN PATENT DOCUMENTS

28365      4/1964   Germany ............................... 249/160
4-229041   8/1992   Japan .
5-288074   11/1993  Japan .

Primary Examiner—Kuang Y. Lin
Attorney, Agent, or Firm—Sughrue, Mion, Zinn, Macpeak & Seas, PLLC

[57] ABSTRACT

A casting mold which enables an article to be molded by replacing only a specification-variable mold component for molding a section of the article when the specification of only that particular section has been modified, thus permitting reduced manufacturing cost of the molding. The casting mold is used for casting a rear bracket 85 a mounting leg 10 which is subject to changes in specification and a component housing 9 which is combined with the mounting leg into one piece. It is equipped with a main body mold 40 for molding the component housing and a specification-variable mold 41 which is detachably connected to the main body mold, which can be replaced according to specifications, and which molds the mounting leg.

3 Claims, 12 Drawing Sheets

CASTING MOLD FOR MOLDINGS

BACKGROUND OF THE INVENTION

1. Field of the Invention

The present invention relates to a casting mold (mold die for casting a bracket of an alternating-current generator to be mounted on a vehicle or the like.

2. Description of the Related Art

Figure 9:
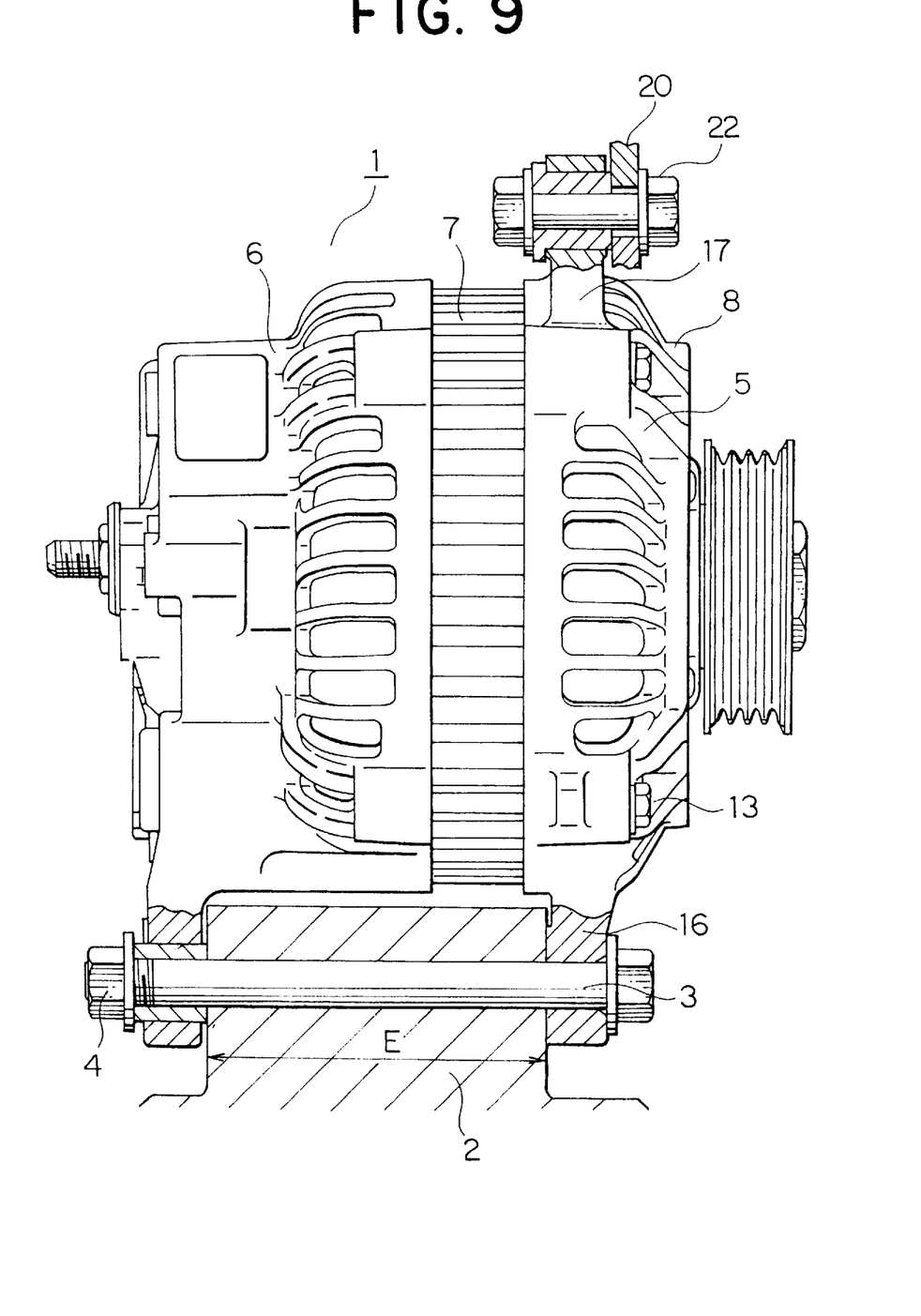
FIG. 9 is a side view with a partial sectional view of a related vehicular alternating-current generator mounted on an engine.

FIG. 9 is a side view showing a related vehicular alternating-current generator which is mounted on an engine. The vehicular alternating-current generator 1 is fixed to a stay 2 of an engine main body by using a bolt 3 and a nut 4. A casing 5 of the vehicular alternating-current generator 1 is constituted by a bowl-shaped rear bracket 6, which incorporates component parts and which is shown at left in the drawing, and a bowl-shape front bracket 8 which clamps a stator 7 in cooperation with the rear bracket 6 and which is shown at right in the drawing. Included in the casing 5 is a rotor (not shown) which is rotatably supported via a bearing (not shown).

Figure 10A:
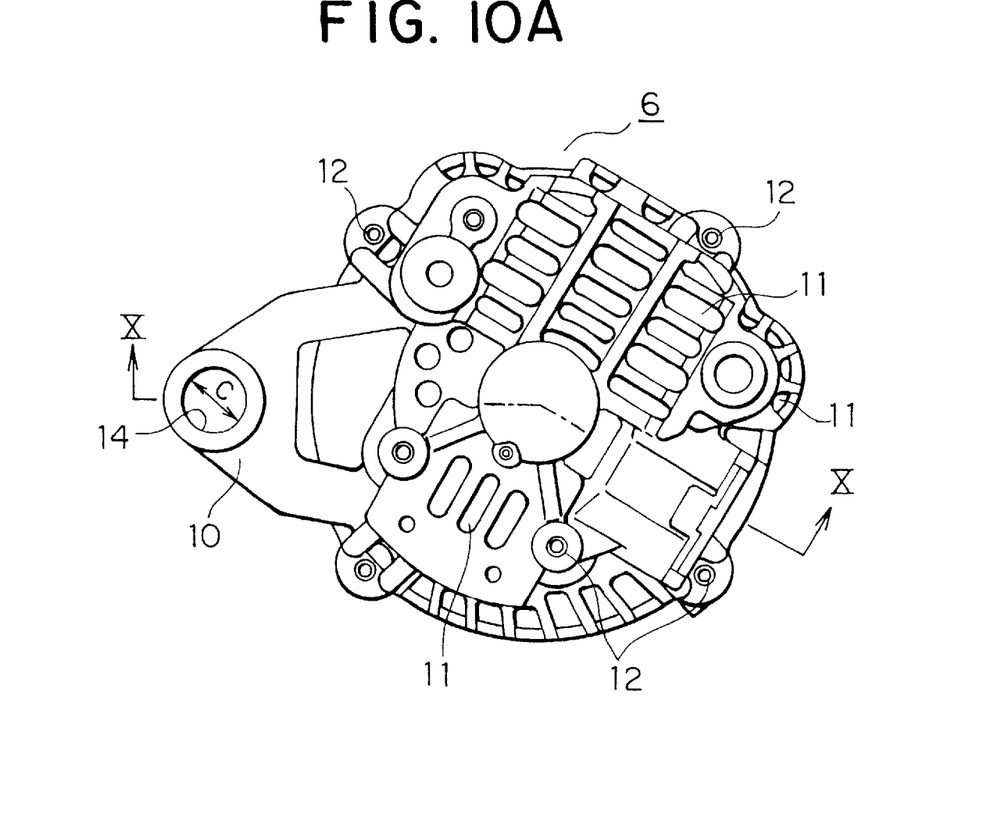
FIG. 10A is a top plan view of the rear bracket shown in FIG. 9
Figure 10B:
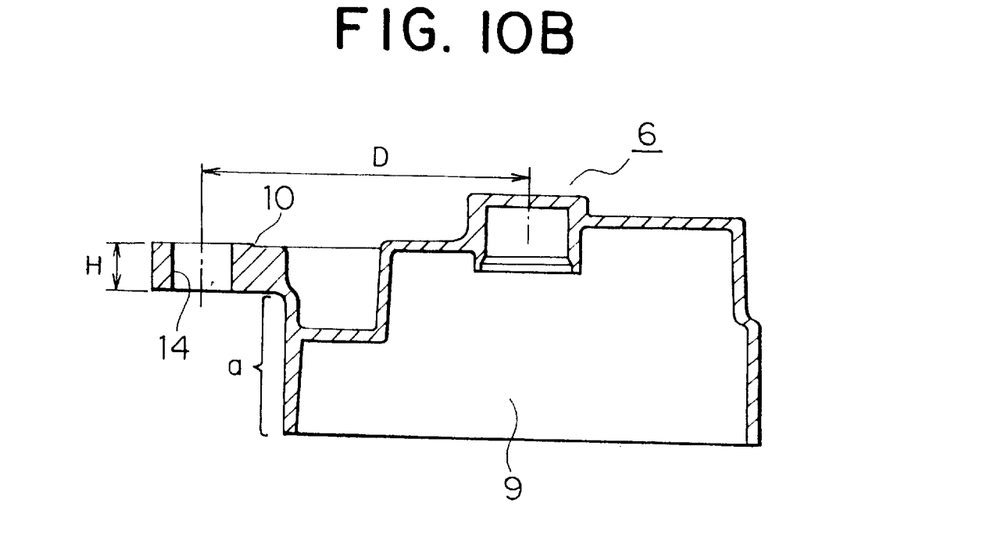
FIG. 10B is a sectional view taken on line X—X shown in FIG. 10A.

FIG. 10A is a top plan view of the rear bracket 6 shown in FIG. 9 and FIG. 10B is a sectional view taken on line X—X shown in FIG. 10A. The rear bracket 6 is comprised of a component housing 9 which is shaped roughly like a bowl, and a mounting leg 10 which is attached to the stay 2. The component housing 9 has cooling windows 11 for cooling the rotor, etc. (not shown) in the casing 5 and tapped holes 12 for bolts 13 for connecting the rear bracket 6 and the front bracket 8, etc. Formed on the distal end of the mounting leg 10, which is v-shaped to minimize the weight thereof, is a mounting hole 14 in which the bolt 3 is inserted. The mounting hole 14 is positioned not too far from a rotary shaft (not shown) of the rotor so as to prevent the alternating-current generator 1, the center of gravity of which is positioned high, from becoming unstable when the alternating-current generator 1 is secured to the stay 2 of the main body of the engine.

Figure 11A:
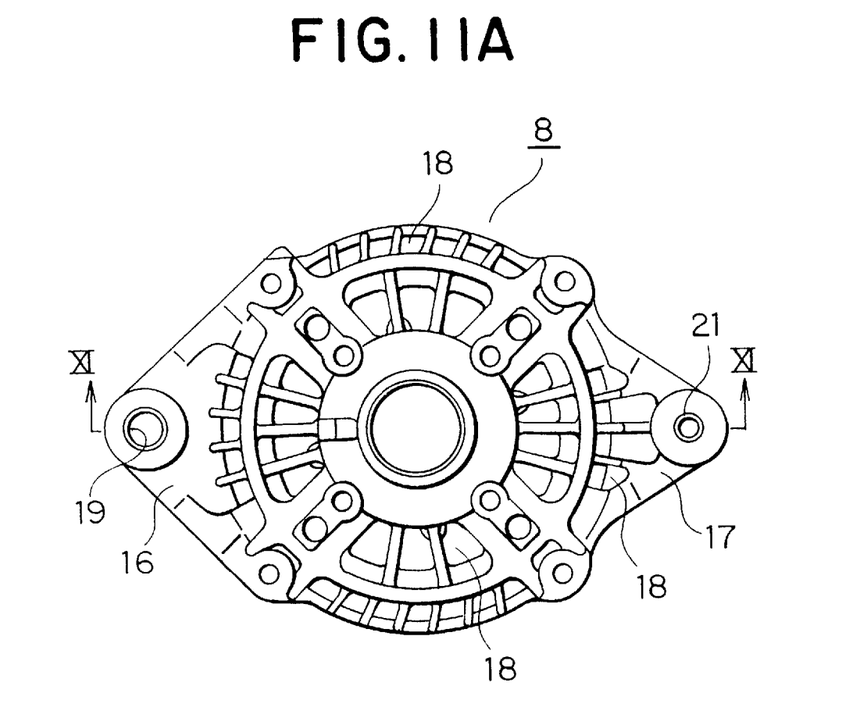
FIG. 11A is a top plan view of the front bracket shown in FIG. 9
Figure 11B:
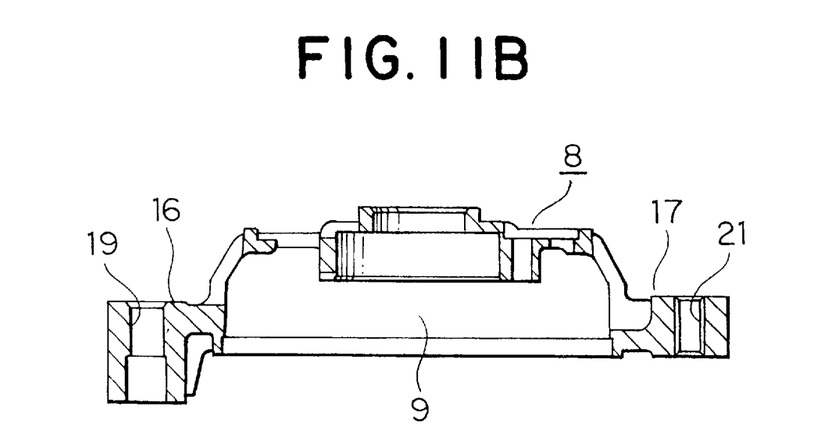
FIG. 11B is a sectional view taken on line XI—XI shown in FIG. 11A.

FIG. 11A is a top plan view of the front bracket 8 shown in FIG. 9 and FIG. 11B is a sectional view taken on line XI—XI shown in FIG. 11A. The front bracket 8 is composed of: the component housing 9 which is shaped like a bowl shallower than that of the rear bracket 6 and which has cooling windows 18; a mounting leg 16 attached to the stay 2; and a mounting section 17 positioned on the opposite side to the mounting leg 16. The mounting leg 16 has a mounting hole 19 in which the bolt 3 is inserted. The mounting section 17 is secured to a base 20 by a bolt 22 which is threaded through a tapped hole 21 as illustrated in FIG. 9.

The rear bracket 6 and the front bracket 8 are produced by the following main steps: pouring molten aluminum into a mold which has been formed by electric discharge machining or the like; forming the cooling windows 11, 18, etc.; removing it from the mold; processing the end surfaces of the-molded article by cutting work; and cutting threads.

Figure 12:
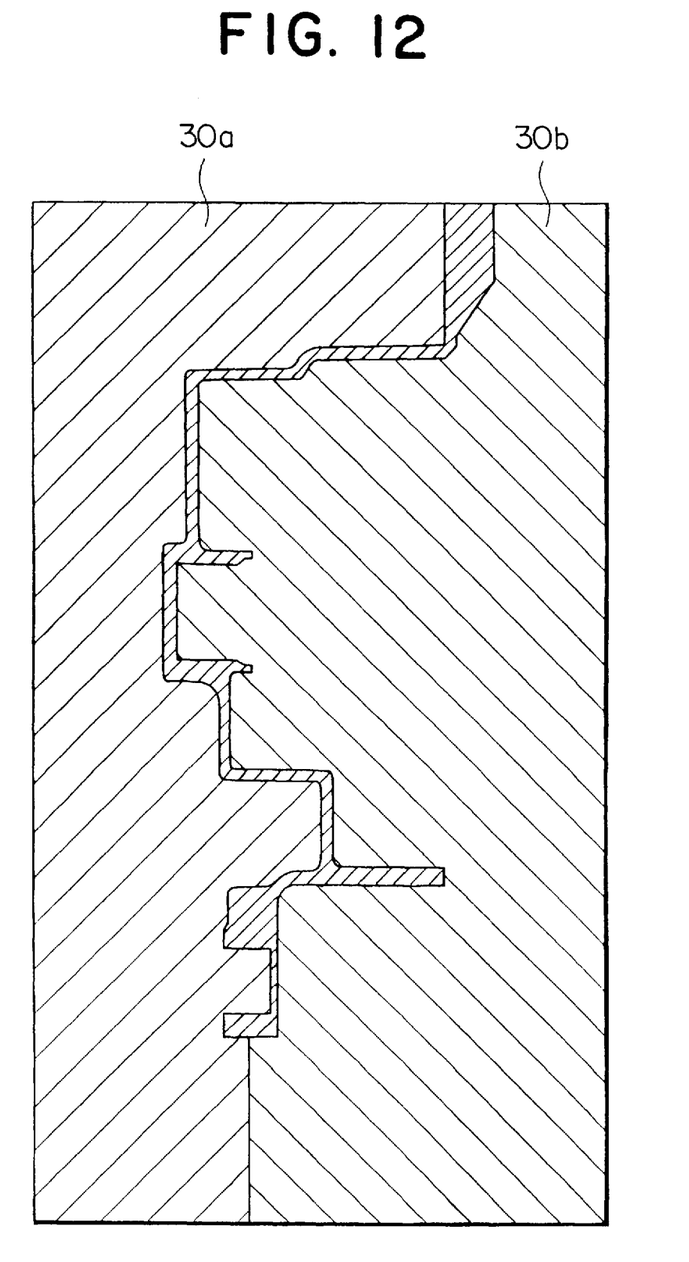
FIG. 12 is a sectional view of the casting mold for the rear bracket shown in FIG. 9.

FIG. 12 is a sectional view of a mold for the rear bracket 6. A cope 30a which is shown at left in the drawing and a drag 30b which is shown at right in the drawing are in close contact, facing each other. In the drawing, the molten aluminum is poured from above and cooled, then the drag 30b is separated from the cope 30a to take out the molded article, namely, the rear bracket. The molded rear bracket is subjected to cutting work, tapping, etc. to be completed as the rear bracket 6.

The component housing 9 of the rear bracket 6 is deeper than that of the front bracket 8; therefore, the volume of the casting mold for the rear bracket 6 is larger. The mold is tapered to a certain extent in the mold separating direction so as to allow the bracket material to be separated from the mold.

The vehicular alternating-current generator 1 generates heat when generating power. Hence, it is necessary to cool the stator, rotor, etc. by air coming through the cooling windows 11 and 18. For this reason, the brackets 6 and 8 are provided with as many cooling windows 11 and 18 as possible without compromising the overall physical strength thereof.

In the conventional vehicular alternating-current generator 1, when the specifications of the mounting legs 10 and 16 are changed (e.g. changing a diameter C of the mounting hole 14 provided in parallel to the rotary shaft, or changing a distance D between the center of the mounting hole 14 and the rotational center of the rotor, or changing a pitch E [width of stay] when the rear bracket 6 and the front bracket 8 are combined, it is necessary to prepare a new casting mold or to machine the whole cope 30 a and drag 30 b even if the shape of the component housing 9 remains utterly unchanged. This has required extra time and labor, leading to higher manufacturing cost.

There has been another problem: because of the molding requirements, for example, the cooling windows cannot be formed directly by molding in a shaded area "a" of the component housing 9 in the shade of the mounting leg 10 as illustrated in FIG. 10B; therefore, the shaded area "a" must be subjected to cutting work after casting, which is an extra machining step.

SUMMARY OF THE INVENTION

The present invention has been made with a view toward solving the problems described above and it is an object of the present invention to provide a casting mold for moldings which enables an article with modified specifications to be molded by changing a specification-variable mold portion designed for molding the modified portion of the article, thereby permitting reduced manufacturing cost of moldings.

It is another object of the present invention to provide a casting mold for moldings which enables holes to be placed in the article being formed during the molding process.

To these ends, according to the present invention, there is provided a casting mold for moldings which is equipped with a main body mold for molding a main body, and a specification-variable mold which is detachably connected to the main body mold, which can be replaced according to specifications and which molds a modified portion.

The modified portion refers to the mounting leg of a bracket to be installed on an intended object; the main body refers to the component housing of the bracket.

Further, the main body mold is constituted by a first main body mold counterpart and a second main body mold counterpart which is opposed to and in close contact with the first main body mold counterpart. The specification-variable mold is constituted by a first specification-variable mold counterpart and a second specification-variable mold counterpart which is opposed to and in close contact with the first specification-variable mold counterpart.

The second specification-variable mold counterpart is provided with a projection for molding holes.

The moldings are the brackets for vehicular alternating-current generators.

DESCRIPTION OF THE PREFERRED EMBODIMENTS

[First Embodiment]

Figure 1:
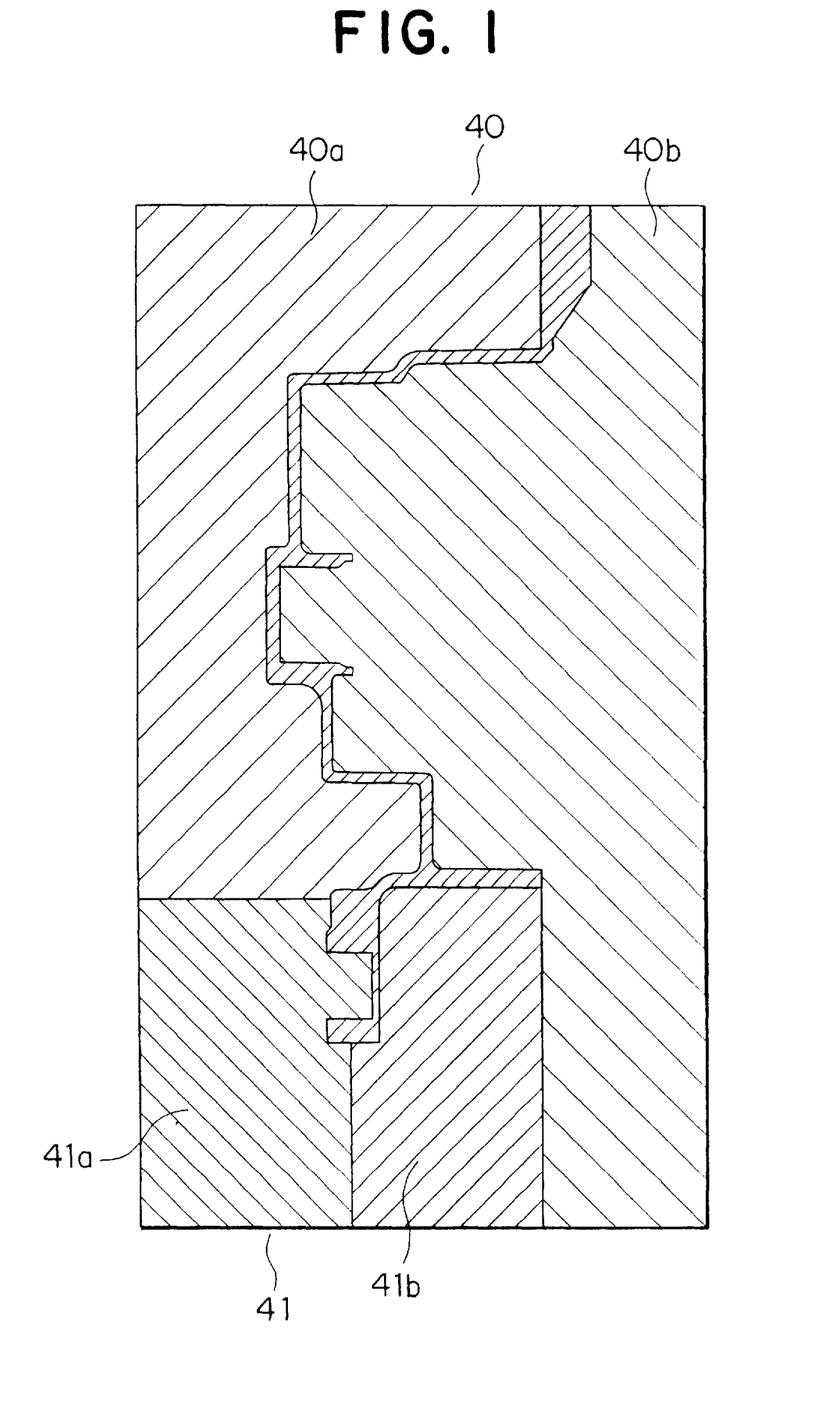
FIG. 1 is a sectional view of a casting mold for a rear bracket of a vehicular alternating-current generator which is an embodiment of the present invention.

FIG. 1 is a sectional view which illustrates a casting mold for a rear bracket of a vehicular alternating-current generator showing an embodiment of the present invention. Parts identical or equivalent to those shown in FIG. 9 through FIG. 12 will be assigned the same reference numerals, and the description thereof will be omitted.

The casting mold for the rear bracket is composed of a main body mold 40 for molding the component housing 9 which is the bowl-shaped main body and a specification-variable mold 41 for molding the mounting leg 10 which can be varied, i.e., its specifications can be modified. The main body 40 is constructed by a first main body mold counterpart 40a and a second main body mold counterpart 40b which is opposed to and in close contact with the first main body mold 40a. A specification-variable mold 41 is constituted by a first specification-variable mold counterpart 41a and a second specification-variable mold counterpart 41b which is opposed to and in close contact with the first specification-variable mold counterpart 41a.

The casting mold described above as related art is composed of two blocks, namely, the cope 30 a and the drag 30 b, while this embodiment is comprised of four blocks, namely, the first main body mold counterpart 40a, the second main body mold counterpart 40b, the first specification-variable mold counterpart 41a, and the second specification-variable mold counterpart 41b.

Casting by combining the separate molds, i.e. the first specification-variable mold counterpart 41a and the second specification-variable mold counterpart 41b, provides the following advantage: if only the mounting leg 10 needs to be modified according to a change in specification, then only the first specification-variable mold counterpart 41a and the second specification-variable mold counterpart 41b need to be removed and modified, thus reducing the required time and labor for the modification.

Moreover, when the specification of only the mounting section of the engine is changed, the conventional casting mold requires both the cope 30 a and the drag 30 b be newly created, whereas this embodiment requires only the small parts, i.e. the first specification-variable mold counterpart 41a and the second specification-variable mold counterpart 41b, to be newly created. In other words, when the shape of the component housing 9 of the rear bracket 6 remains unchanged, only the cost for creating the first specification-variable mold counterpart 41a and the second specification-variable mold counterpart 41b will be added, resulting in lower manufacturing cost of the rear bracket 6.

Likewise, the rear bracket 6 in which only the thickness of the mounting leg 10 and the angle of the V shape thereof are different can be manufactured by using the same first main body mold counterpart 40a and the second main body mold counterpart 40b, thus enabling significant reduction in the manufacturing cost of the rear bracket 6.

The mounting leg 10 is required to have an appropriate thickness H and shape to achieve lighter weight and assure adequate strength at the same time. Such thickness H and shape can be obtained by modifying only the first specification-variable mold counterpart 41a and the second specification-variable mold counterpart 41b.

[Second Embodiment]

Figure 2:
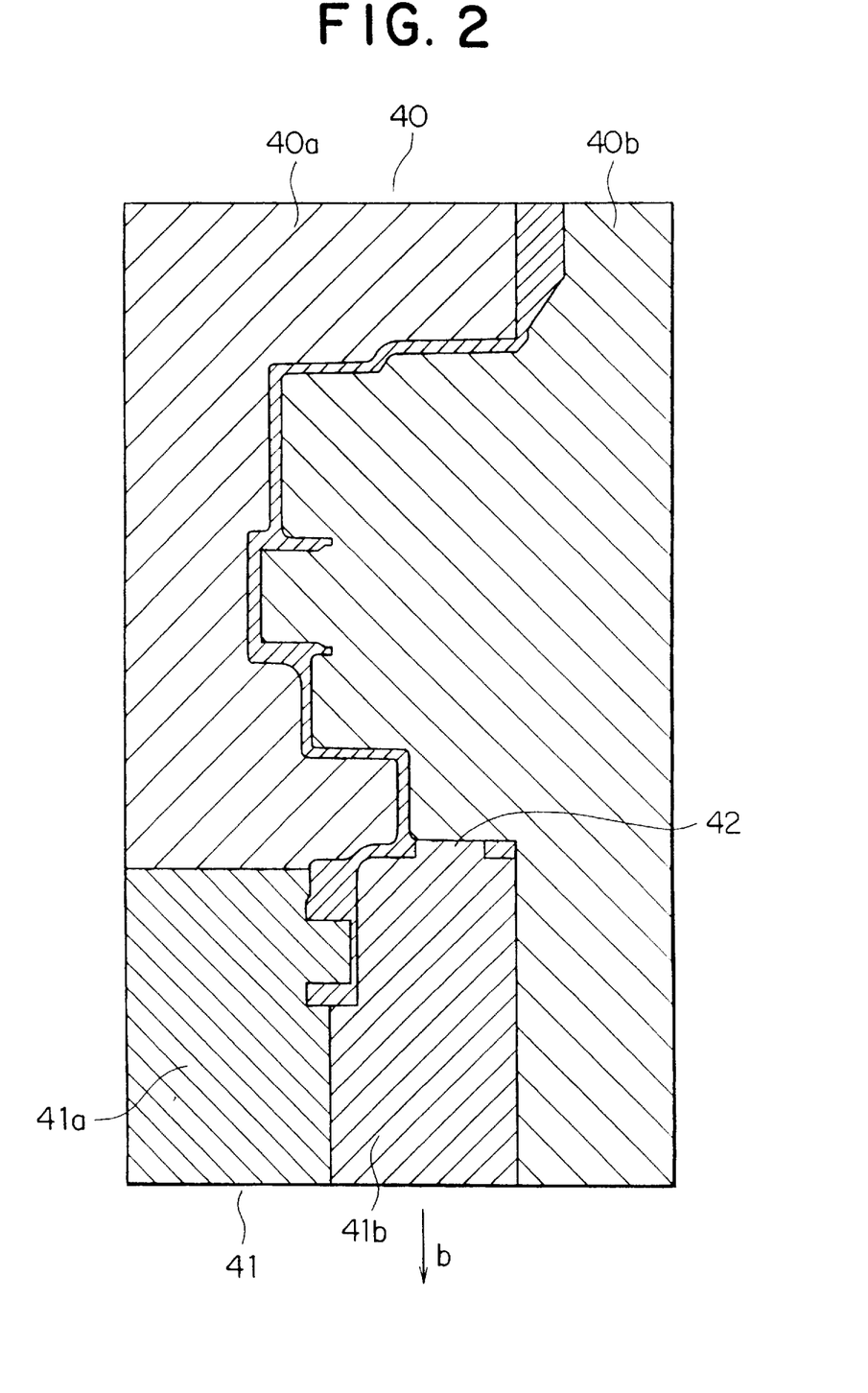
FIG. 2 is a sectional view of a casting mold for a rear bracket of a vehicular alternating-current generator which is another embodiment of the present invention.
Figure 3A:
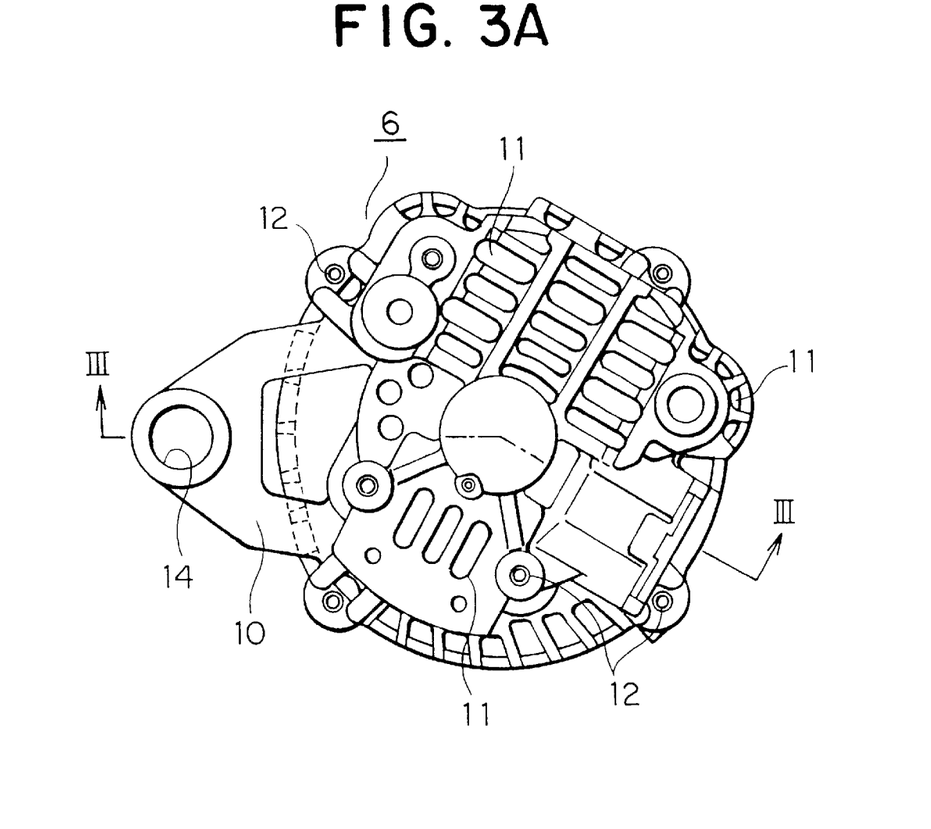
FIG. 3A is a top plan view of a rear bracket which has been molded using the casting mold shown in FIG. 2 and which has been machined.
Figure 3B:
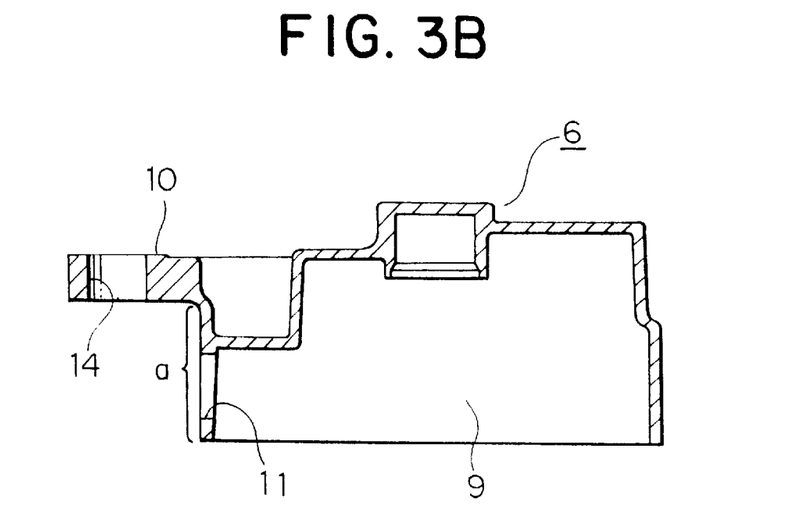
FIG. 3B is a sectional view taken on line III—III shown in FIG. 3A.

FIG. 2 is a sectional view of the casting mold for the rear bracket 6 of the vehicular alternating-current generator illustrative of another embodiment of the present invention; FIG. 3A is a top plan view of a rear bracket which has been molded using the casting mold shown in FIG. 2 and which has been machined thereafter; and FIG. 3B is a sectional view taken on line III—III shown in FIG. 3A.

In the casting mold according to this embodiment, the second specification-variable mold counterpart 41b has a projection 42 for molding the cooling windows 11 which are openings.

Figure 4:
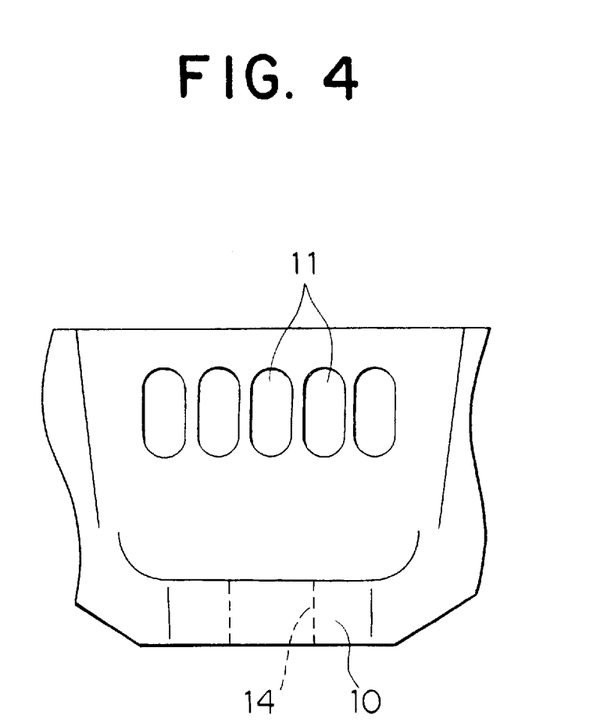
FIG. 4 is a side view of the rear bracket of FIG. 3A and FIG. 3B observed from the mounting leg.

The second specification-variable mold counterpart 41b can be separated from the second main body mold counterpart 40b in the direction of arrow "b"; therefore, by forming the projection 42 on the second specification-variable mold counterpart 41b, the cooling windows 11 shown in FIG. 4 can be formed by molding even in the shaded area "a" of the component housing 9 which is in the shade of the mounting leg 10.

[Third Embodiment]

Figure 5:
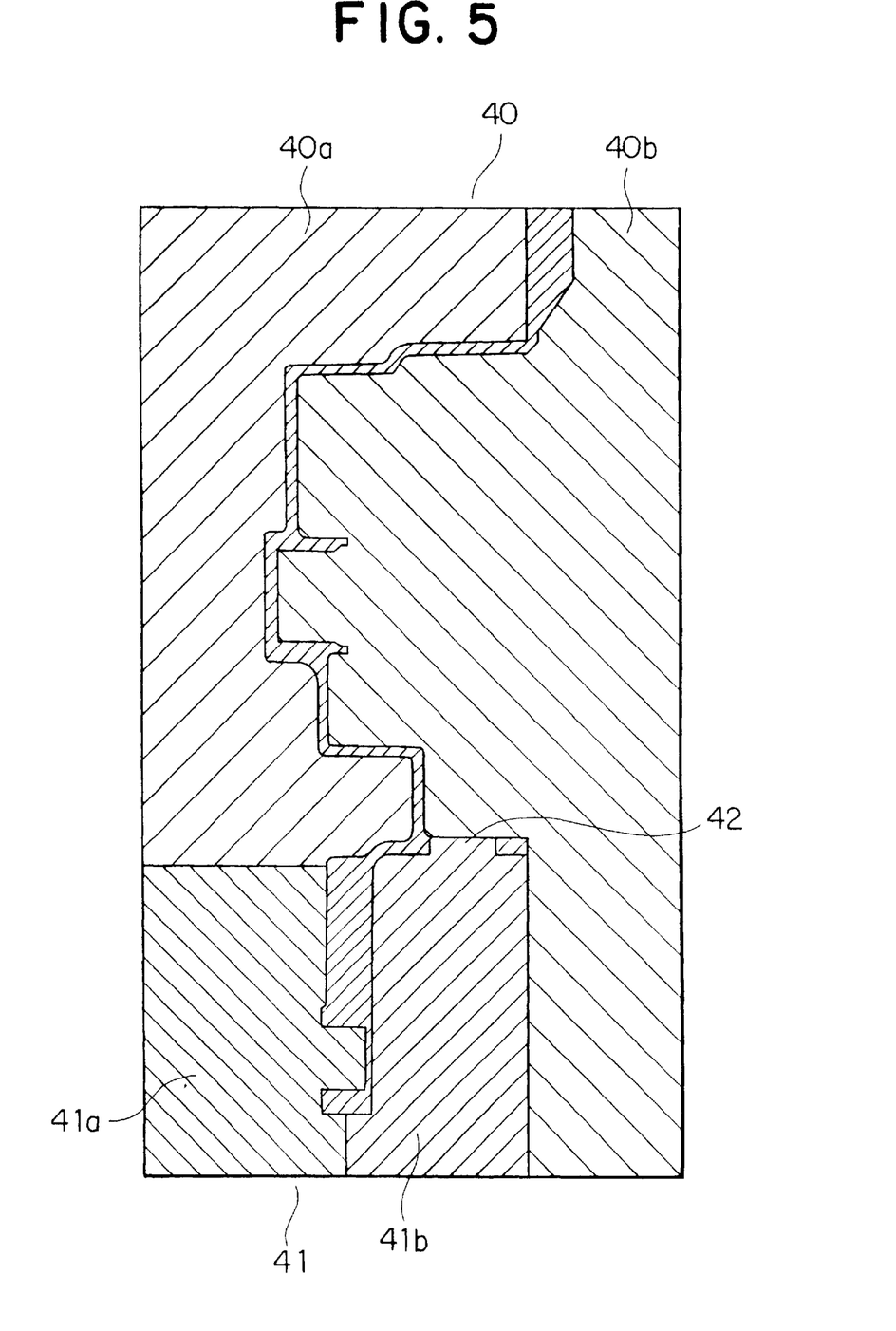
FIG. 5 is a sectional view of a casting mold for the rear bracket of a vehicular alternating-current generator which is yet another embodiment of the present invention.
Figure 6A:
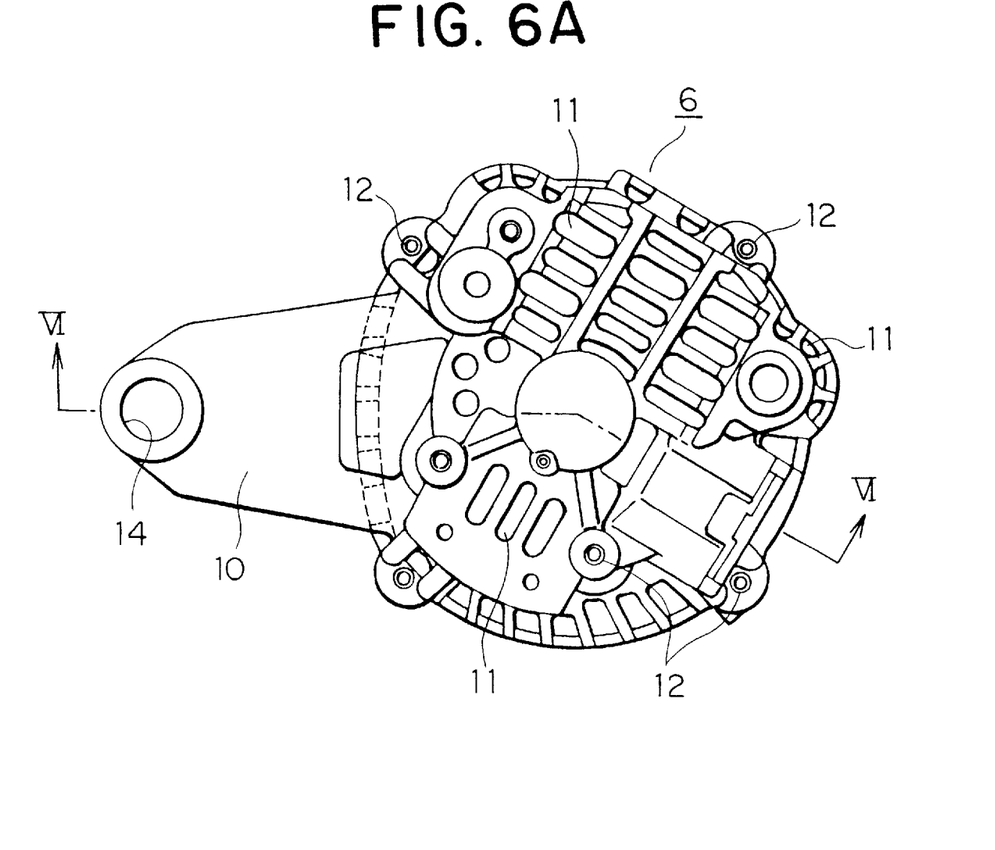
FIG. 6A is a top plan view of a rear bracket which has been molded using the casting mold shown in FIG. 5 and which has been machined.
Figure 6B:
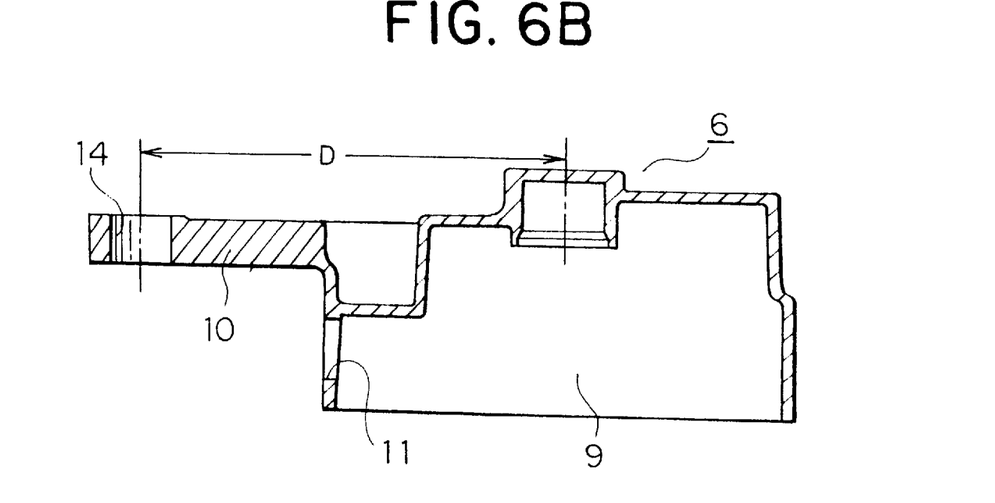
FIG. 6B is a sectional view taken on line VI—VI shown in FIG. 6A.

FIG. 5 is a sectional view showing the casting mold for the rear bracket of the vehicular alternating-current generator illustrative of still another embodiment of the present invention; FIG. 6A is a top plan view showing the rear bracket which has been molded using the casting mold shown in FIG. 5 and machined thereafter; and FIG. 6B is a sectional view taken on line VI—VI shown in FIG. 6A.

The third embodiment is different from the second embodiment in that the distance D between the center of the mounting hole 14 and the center of the rotary shaft is larger.

[Fourth Embodiment]

Figure 7:
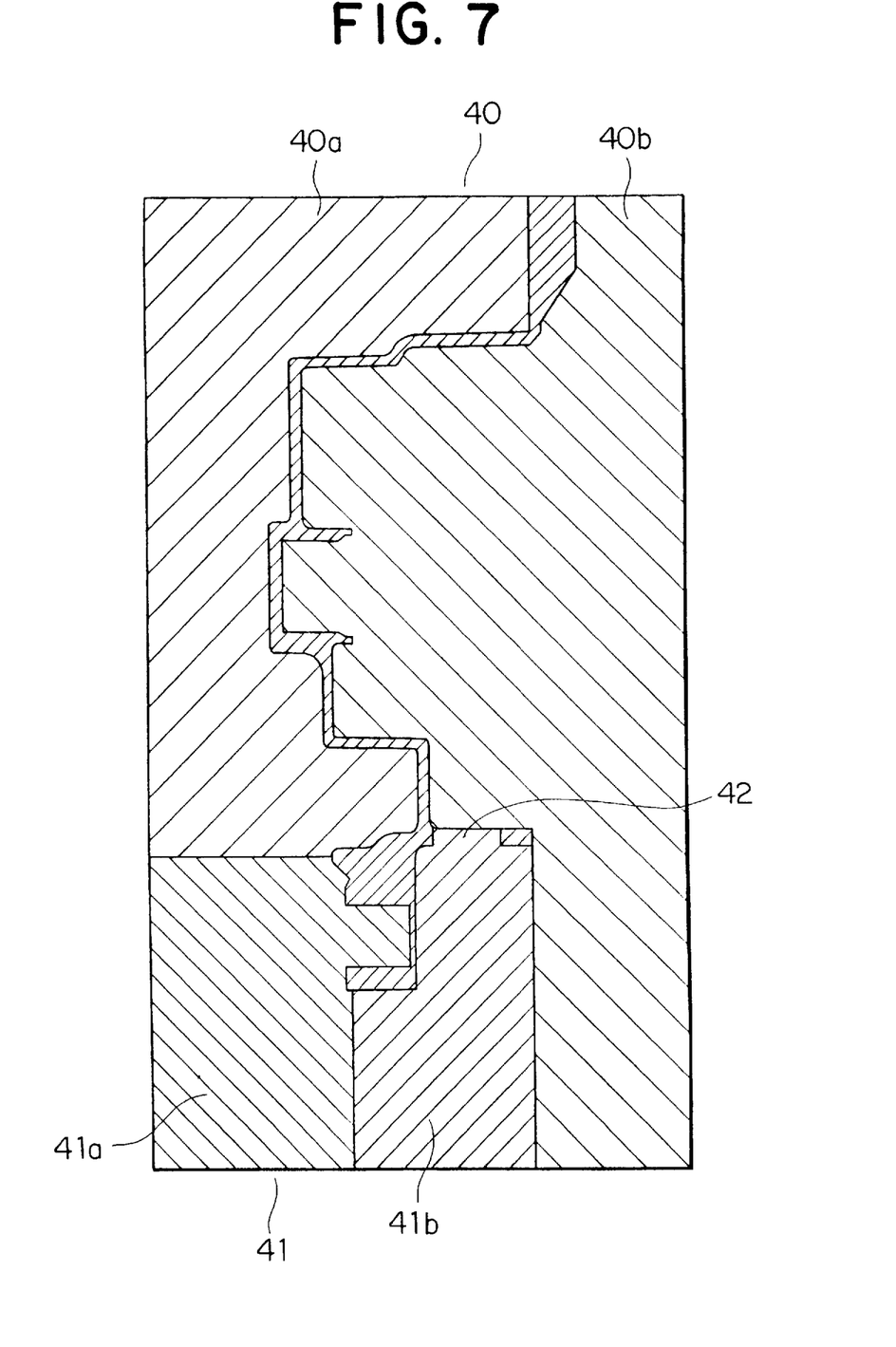
FIG. 7 is a sectional view of a casting mold for the rear bracket of a vehicular alternating-current generator which is yet another embodiment of the present invention.
Figure 8A:
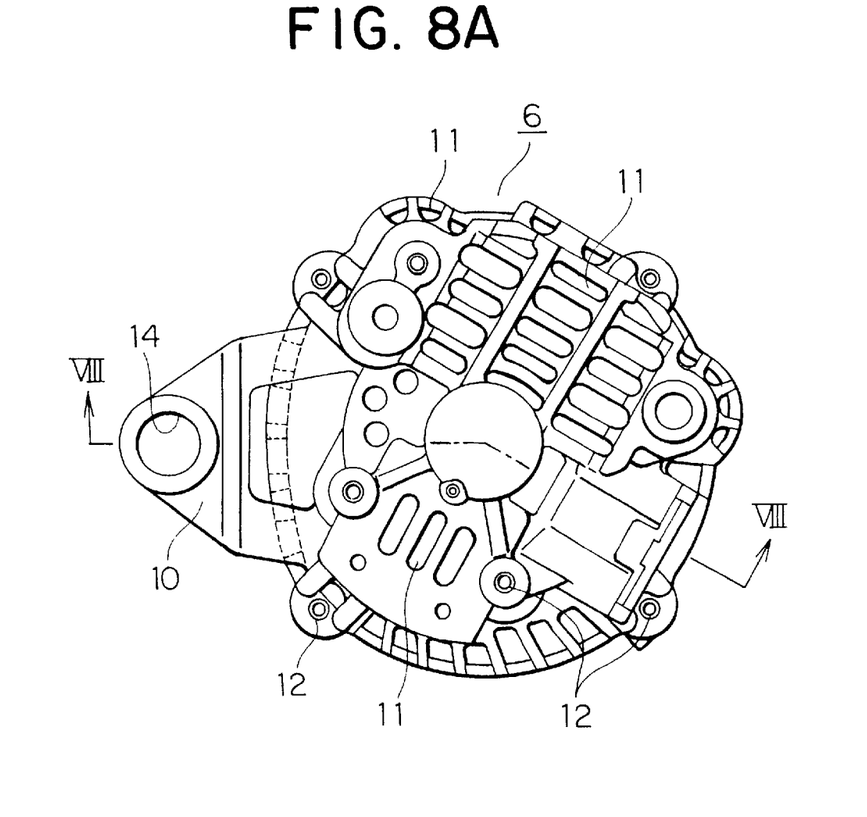
FIG. 8A is a top plan view of a rear bracket which has been molded using the casting mold shown in FIG. 7 and which has been machined.
Figure 8B:
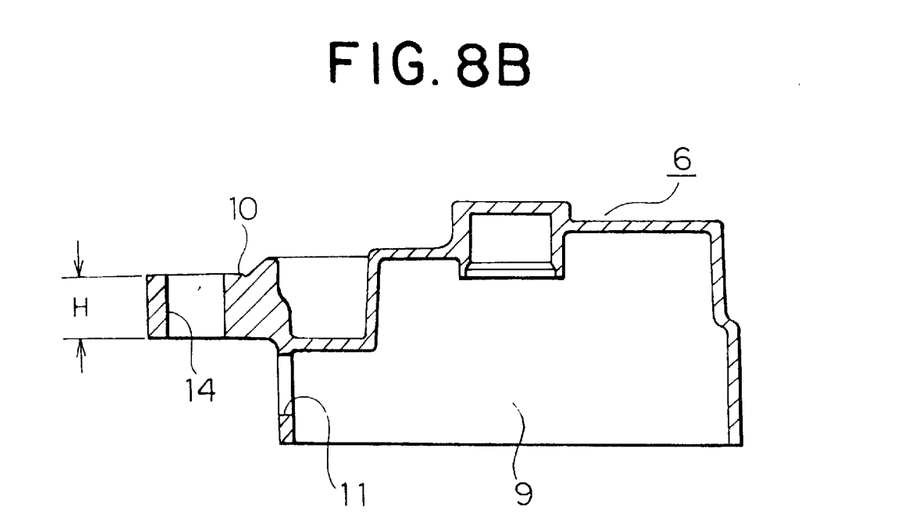
FIG. 8B is a sectional view taken on line VIII—VIII shown in FIG. 8A.

FIG. 7 is a sectional view showing the casting mold for the rear bracket of the vehicular alternating-current generator illustrative of yet another embodiment of the present invention; FIG. 8A is a top plan view showing the rear bracket which has been molded using the casting mold shown in FIG. 7 and machined thereafter; and FIG. 8B is a sectional view taken on line VIII—VIII shown in FIG. 8A.

The fourth embodiment is different from the second embodiment in that the thickness H of the mounting leg 10 is greater.

All the embodiments described above use, as the molded article, the rear bracket 6 of the vehicular alternating-current generator; however, the casting molds described in the embodiments can also be used for molding the front bracket 8. Further, the casting mold in accordance with the present invention can also be used for molding, for example, the bracket of a starter and the housing of a distributor.

Thus, the casting mold for moldings in accordance with the present invention makes it possible to cast moldings of different specifications by changing only the specification-variable mold counterparts corresponding to the modified portions, thus permitting reductions in the cost involved in specification changes in moldings with consequent reductions in the manufacturing cost of moldings.

In addition, the second specification-variable mold counterpart provided with the projection for molding holes in moldings makes it possible to easily form by molding the cooling windows on, for example, the component housing of the bracket of a vehicular alternating-current generator, which has not been achievable by conventional casting molds.

What is claimed is:

1. An adjustable, multiple-part casting mold for molding an end of bracket of a dynamoelectric machine, said bracket being constituted by a constant specification, bowl-shaped main body, and a variable specification mounting leg section which is subject to dimensional configuration variations due to changes in design specifications, said mounting leg section extending radially outwardly from said main body and being unitarily molded therewith into one piece, said casting mold comprising:

a) a constant specification main body mold defining a bowl-shaped first cavity for molding said main body, and defining a radially extending recess for accommodating a cooperating mold; and b) a cooperating, variable specification mold detachably disposed in said main body mold recess and defining a second cavity for molding said variable specification mounting leg section;

c) wherein said first and second mold cavities are in communication with one another, and said second mold cavity extends radially outwardly from said first mold cavity, said variable specification mold being replaceable according to changes in design specifications.

2. A casting mold according to claim 1, wherein the main body mold is comprised of a first main body mold counterpart (40*a*) and a second main body mold counterpart (40*b*) which mates with the first main body mold counterpart to define the first cavity, and the variable-specification mold is comprised of a first variable-specification mold counterpart (41*a*) and a second variable-specification mold counterpart (41*b*) which mates with the first variable-specification mold counterpart to define the second cavity.

3. A casting mold according to claim 2, wherein the second variable-specification mold counterpart has a projection (42) which abuts said main body mold and forms a ventilation window (11) in said bracket during molding.

* * * * *